United States Patent [19]

Lanier et al.

[11] Patent Number: 4,855,331

[45] Date of Patent: Aug. 8, 1989

[54] PRODUCTION OF FOAMED POLYMER STRUCTURES

[75] Inventors: Caroll W. Lanier, Baker; H. Eugene Broemmelsiek, Baton Rouge, both of La.; Raymond Lee, Elk Grove Village, Ill.

[73] Assignee: Ethyl Corporation, Richmond, Va.

[21] Appl. No.: 277,541

[22] Filed: Nov. 28, 1988

Related U.S. Application Data

[62] Division of Ser. No. 209,018, Jun. 20, 1988, Pat. No. 4,822,537.

[51] Int. Cl.$^4$ .......................... B29C 35/00; C08J 9/02
[52] U.S. Cl. ...................................... 521/184; 264/26; 264/54; 521/77; 521/183; 521/185; 521/189; 521/915; 528/229; 528/353
[58] Field of Search .................. 521/77, 184, 185, 183, 521/189, 915; 528/229, 353; 264/26, 54, DIG. 5

[56] References Cited

U.S. PATENT DOCUMENTS

| | | |
|---|---|---|
| Re. 30,213 | 2/1980 | Gagliani et al. ...................... 521/185 |
| Re. 32,255 | 9/1986 | Gagliani et al. ....................... 521/56 |
| Re. 32,356 | 9/1986 | Gagliani et al. ..................... 521/180 |
| 3,506,583 | 4/1970 | Boram et al. ......................... 252/188 |
| 3,700,649 | 10/1972 | Boram et al. ........................... 260/65 |
| 3,726,831 | 4/1973 | Acle et al. ........................ 260/47 CP |
| 3,726,834 | 4/1973 | Acle ....................................... 260/65 |
| 3,793,281 | 2/1974 | Acle .................................. 260/2.5 N |
| 4,070,312 | 1/1978 | Gagliani et al. ................... 260/2.5 N |
| 4,153,783 | 5/1979 | Gagliani et al. ...................... 528/337 |
| 4,241,114 | 12/1980 | Gagliani .............................. 427/370 |
| 4,241,193 | 12/1980 | Gagliani ................................ 521/77 |
| 4,255,488 | 3/1981 | Gagliani .............................. 428/398 |
| 4,273,886 | 6/1981 | Gagliani .............................. 521/185 |
| 4,296,208 | 10/1981 | Gagliani ................................ 521/77 |
| 4,299,787 | 11/1981 | Gagliani ................................ 264/41 |
| 4,305,796 | 12/1981 | Gagliani et al. ...................... 204/159 |
| 4,315,076 | 2/1982 | Gagliani et al. ........................ 521/77 |
| 4,315,077 | 2/1982 | Gagliani et al. ........................ 521/77 |
| 4,315,080 | 2/1982 | Gagliani et al. ...................... 521/189 |
| 4,319,000 | 3/1982 | Gagliani et al. ...................... 521/189 |
| 4,332,656 | 6/1982 | Gagliani et al. ...................... 204/159 |
| 4,346,182 | 8/1982 | Gagliani et al. ...................... 521/189 |
| 4,353,998 | 10/1982 | Gagliani et al. ...................... 523/219 |
| 4,355,120 | 10/1982 | Gagliani et al. ...................... 521/189 |
| 4,360,604 | 11/1982 | Gagliani et al. ...................... 521/189 |
| 4,361,453 | 10/1982 | Gagliani et al. ........................ 156/79 |
| 4,363,690 | 12/1982 | Gagliani et al. ...................... 156/307 |
| 4,363,883 | 12/1982 | Gagliani et al. ...................... 521/122 |
| 4,367,296 | 1/1983 | Gagliani et al. ...................... 521/189 |
| 4,369,261 | 1/1983 | Gagliani et al. ...................... 521/189 |
| 4,407,980 | 10/1983 | Gagliani et al. ........................ 521/99 |
| 4,425,441 | 1/1984 | Gagliani et al. ........................ 521/56 |
| 4,426,463 | 1/1984 | Gagliani et al. ...................... 521/180 |
| 4,433,068 | 2/1984 | Long et al. ............................ 521/54 |
| 4,439,381 | 3/1984 | Gagliani et al. ........................ 264/26 |
| 4,442,283 | 4/1984 | Gagliani et al. ...................... 528/323 |
| 4,444,823 | 4/1984 | Gagliani et al. ...................... 428/113 |
| 4,468,431 | 8/1984 | Okey ..................................... 428/317 |
| 4,476,254 | 10/1984 | Long et al. .......................... 521/180 |
| 4,506,038 | 3/1985 | Gagliani et al. ...................... 521/103 |
| 4,518,717 | 5/1985 | Long et al. .......................... 521/109 |
| 4,535,099 | 8/1985 | Lee et al. ............................. 521/154 |
| 4,535,101 | 8/1985 | Lee et al. ............................. 521/189 |
| 4,539,336 | 9/1985 | Long et al. ............................ 521/77 |
| 4,539,342 | 9/1985 | Lee et al. ............................. 521/189 |
| 4,546,115 | 10/1985 | Gagliani et al. ........................ 521/77 |
| 4,556,682 | 12/1985 | Gagliani et al. ...................... 521/185 |
| 4,562,112 | 12/1985 | Lee et al. ............................. 428/318 |
| 4,576,862 | 3/1986 | Lee et al. ............................. 428/317 |
| 4,585,805 | 4/1986 | Gagliani et al. ...................... 521/129 |
| 4,599,365 | 7/1986 | Gagliani et al. ........................ 521/56 |
| 4,600,770 | 7/1986 | Gagliani et al. ...................... 528/322 |
| 4,604,409 | 8/1986 | Gagliani et al. ...................... 521/157 |
| 4,621,015 | 11/1986 | Long et al. .......................... 428/317 |
| 4,639,343 | 1/1987 | Long et al. .......................... 264/45.5 |
| 4,647,597 | 3/1987 | Shulman et al. ..................... 521/185 |
| 4,656,198 | 4/1987 | Shulman et al. ....................... 521/56 |
| 4,708,972 | 11/1987 | Long et al. .......................... 521/185 |

FOREIGN PATENT DOCUMENTS 103733 8/1983 X European Pat. Off. .
170826 6/1985 European Pat. Off. .
2303273 7/1974 Fed. Rep. of Germany .

OTHER PUBLICATIONS

Gagliani, et al, NAS9-15848, Final Report 2/15/77–4/15/80 Entitled "Development of Fire-Resistant, Low Smoke Generating, Thermally Stable End Items for Commercial Aircraft & Spacecraft Using a Basic Polyimide Resin".

Gagliani, et al, NAS9-16009, Final Report 2/15/80–9/30/81 Entitled "Formulation & Characterization of Polyimide Resilient Foams of Various Densities for Aircraft Seating Applications".

*Primary Examiner*—Morton Foelak
*Attorney, Agent, or Firm*—John F. Sieberth

[57] ABSTRACT

Described are ways of improving the yields of specification grade polyimide foam on a consistent basis from one run to the next, by use of improved microwave-based foaming processes. In one such process, during the application of the microwave radiation, the body of polyimide precursor and of the foam structure as it is developing therefrom are maintained under a substantially vapor-impermeable microwave-compatible shroud that does not substantially restrict or impede development of the foam structure; and the microwave radiation is directed upon the top, sides and ends of the body of polyimide precursor and of the foam structure as it is developing, but the extent to which such radiation impinges upwardly into the bottom of said body and said foam structure is curtailed, preferably by means of a metallic shield located below the precursor and developing foam structure. Mechanisms by which the shields and shrouds function to provide the improvements of the process are discussed, and methods based thereon are set forth.

15 Claims, No Drawings

PRODUCTION OF FOAMED POLYMER STRUCTURES

This application is a division of application Ser. No. 209,018, filed June 20, 1988 U.S. Pat. No. 4,822,337.

TECHNICAL FIELD

This invention relates to the production of cellular polymeric structures, and more particularly to improvements in the manufacture of polyimide foams.

BACKGROUND

Over the years, considerable effort has been devoted to the development of technology for producing polyimide foams. Such materials are generally produced by forming a polyimide precursor, usually an essentially equimolar mixture of a lower alkyl ester of a tetracarboxylic acid and one or more primary diamines, and subjecting a bed or body of this polyimide precursor mixture to a temperature sufficient to cause the development of a foamed polymer structure through the generation and evolution of gaseous material within the body of the precursor. See for example U.S. Pat. Nos. 4,153,783, 4,296,208, 4,305,796, 4,439,381 and Re. 30,213. Although the foaming operation may be performed in thermal ovens or by use of dielectric heating, to date use of microwaving as described in U.S. Pat. Nos. 4,305,796 and 4,439,381 has proven most successful.

Despite the intensity and magnitude of the efforts to improve upon the technology of polyimide foam production, a number of difficulties have defied solution. Chief among these has been the inability to achieve consistently high yields of useable foam from the polyimide precursor. As formed, the polyimide leaves the oven in the form of a "bun" which has a crust over its outer surface which must be cut away in order to expose the interior cellular mass of cured polyimide foam. Unfortunately, blow holes, striations and other physical defects are often encountered in the buns, which means that the defective zones within the bun must be trimmed away and discarded, often with a condsiderable loss of raw materials and plant throughput. Complicating the problem has been the erratic nature of these events—only after the bun had been made and trimmed can it be determined whether the production run has been successful or not. Moreover, successive runs conducted under apparently the same conditions may give rise to vastly different results. In one case the yield of specification grade foam may be reasonably good, yet in the very next run it may be unacceptably low.

A most worthwhile contribution to the art would thus be the discovery of a way of improving the yields of specification grade polyimide foam on a consistent basis from one run to the next. This invention is believed to fulfill this need.

THE INVENTION

Provided by this invention are improvements in microwave-based foaming processes. In accordance with one embodiment of this invention during the application of the microwave radiation, the body of polyimide precursor and of the foam structure as it is developing therefrom are maintained under a substantially vapor-impermeable microwave-compatible shroud that does not substantially restrict or impede development of the foam structure; and the microwave radiation is directed upon the top, sides and ends of the body of polyimide precursor and of the foam structure as it is developing therefrom, but the extent to which such radiation impinges upwardly into the bottom of said body and said foam structure is curtailed.

One way of accomplishing this radiation curtailment is to design the microwave cavity so that the radiation is not directed upwardly into the precursor of developing foam. However a preferred method for accomplishing this curtailment involves maintaining a microwave radiation-curtailing shield between the precursor body and a source of microwave radiation therebelow. Not only does this avoid the difficulty ands expense of redesigning and producing specially made microwave cavities, but it enables certain other operational advantages (described below) to be achieved when employing and properly positioning certain types of shields in the microwave cavity.

While various microwave-blocking materials may be used, the shield is preferably a metallic shield, and most preferably a shield composed of a metal or matallic alloy having a heat capacity similar to that of alumimnum. In addition, the metal preferably does not conduct heat substantially more rapidly than aluminum.

Suitable metals include aluminum, aluminum-silicon alloys, ferroalloys, copper, titanium, stainless steel, gold, silver, and the like.

When using a metal shield it is particularly desirable to maintain the shield at a suitable temperature in the range of about 50° to about 200° C. before the time of foaming. Aluminum is particularly well suited for use as a shield since its heat capacity and thermal conductivity enable it to be preheated to the desired temperature within this range and be positioned in close proximity to the bottom of the bed, and thus suitably control the temperature of the precursor before and during the actual generation of the foamed mass.

Another advantage of employing a metal shield having thermal properties comparable to aluminum is that upon the completion of one microwaving operation, the foamed mass can be removed from the microwave cavity for thermal curing in a thermal oven, and another batch of precursor promptly put in place for the next, run. The metal shield will retain enough heat from the prior run to heat up the lower portion of the incoming precursor to a temperature in or close to the desired temperature range by the time the application of the microwave radiation is begun. Thus the metallic shield conserves thermal energy for effective use in the process and in so doing, enable plant throughput to be increased.

The polyimide precursor, when in the form of a powder, is preferably placed on a heat stabnle cloth which in turn is positioned on or a suitable distance above the metallic shield. Among the materials from which such cloths may be fabricated are glass coated with a Teflon resin or other high temperature resin, glass cloth, ceramic cloth, fiberglass cloth, quartz cloth, and the like.

In accordance with, and as an outgrowth of the use of a shield, another embodiment of this invention provides a method of producing a foamed polymer structure which comprises:

(i) raising the temperature of at least the lower portion of a body of polyimide precursor to a suitable temperature in the range of about 50° to about 200° C., (preferably in the range of about 60° to about 130° C.), (ii) while at least said lower portion is at said temperature, commencing the exposure of the body of polyimide precursor to microwave radiation of intensity sufficient to cause the development of a foamed polymer structure by generation and evolution of gaseous material within the body of the precursor, and (iii) maintaining the body of polyimide precursor and of the foam structure as it is developing therefrom under a substantially vapor-impermeable microwave-compatible shroud that does not substantially restrict or impede development of the foam structure.

The operation of (i) hereof may be effected simply by use of a metallic or other shield having a suitably high heat capacity, heated from a prior run, as the source of heat for heating up the precursor to the desired temperature. Alternatively, contact or radiant heaters may be positioned in the microwave cavity below the bed of precursor and above the microwave shield (if used) so that the temperature of the precursor or at least the lower portion thereof can be elevated to the desired temperature just prior to initiating the flow of microwave radiation into the precursor. Other ways of preheating the precursor prior to the onset of the microwave radiation may also be used.

In the various embodiments of this invention described above, before and during the time the body of polyimide precursor is exposed to microwave radiation, outer surfaces of the body of polyimide precursor and of the foam structure as it is developing therefrom are kept under a substantially vapor-impermeable microwave-compatible shroud that does not substantially restrict or impede development of the foam structure. For this purpose use may be made of a shroud composed of a polymer film, such as polyvinyl chloride (PVC), polyvinylidene chloride, polyethylene, polypropylene, nylon, polyethylene terephthalate or the like. The suitability of any given polymer film can readily be determined by simply running a few preliminary small scale foaming experiments using various candidate films to see which ones result in the formation of desirable foam structures during the microwaving step.

In practice suitably-sized sheets or strips of the film are placed over the top and around the sides and ends of the body of polyimide precursor before the microwave radiation is applied. The film should not be applied so that it excessively constricts the expansion of the developing film structure. Films having stretch characteristics are useful in this regard, provided of course that they are made of materials that can withstand the temperatures that are developed in the microwaving operation.

Several beneficial mechanisms are believed to occur because of the use of a shroud. In the first place, polyimide precursors, especially when in powder form, are very hygroscopic. Thus the film is believed to prevent the precursor from picking up too much moisture from the atmosphere before the microwave radiation is applied. Secondly, when a body of polyimide precursor is exposed to the microwave radiation, the development of a foamed polymer structure is caused by the generation and evolution of gaseous material within the body of the precursor. This gaseous material initially is predominantly vaporous alcohol (e.g., methanol or ethanol) being liberated from the ester component in the precursor, along with some water vapor which is also liberated in the reactions taking place within the precursor mixture. In the absence of the vapor-impermeable microwave-compatible shroud this gaseous material leaves the surface of the developing foam and allows the surface to dry out and become hard and crusty, which in turn impedes proper development of additional foam within the interior of the bun, and provides areas for excessive heat build up with consequent adverse effects on foam quality. Careful observation of the surface of buns developing when encased by a shroud pursuant to this invention indicates that the surface does not dry out as it would if left exposed, and in fact in some cases the surface appears to have become wet with condensed vapor from the alcohol and/or water enriched atmosphere which the shroud maintains around the developing foam. It will be understood and appreciated, of course, that this invention is not to be limited by any particular theory or to any particular mechanism of operation. The foregoing explanation conforms to the observations made to date and is believed to be a rational explanation of why the shroud performs so successfully. However this invention is not intended to be, nor should it be, limited by theoretical considerations—the invention works, and it works well, irrespective of exactly how it works.

Another way of adapting the concept of the shroud to the microwaving operation is to maintain a suitable quantity of the percursor, whether in powder or liquid form, encased in a sealed bag or pouch of vapor-impermeable, microwave-compatible material, such as a plastic bag or pouch, from around the time it is formed and to use the bag or pouch of precursor in the microwaving step. In this way all of the foregoing benefits of the shroud are achieved and additionally, handling, storage and transport of the precursor are facilitated.

In accordance with, and as an outgrowth of, the use of a shroud, another embodiment of this invention provides a method of producing a foamed polymer structure which comprises:

(i) raising the temperature of at least the lower portion of a body of polyimide precursor to a suitable temperature in the range of about 50° to about 200° C., (preferably in the range of about 60° to about 130° C.), (ii) while at least said lower portion is at said temperature, commencing the exposure of the body of polyimide precursor to microwave radiation of intensity sufficient to cause the development of a foamed polymer structure by generation and evolution of gaseous material within the body of the precursor, and (iii) concurrently maintaining the precursor and the foam structure developing therefrom under an atmosphere enriched in vapors of a lower alcohol.

The operation of (i) hereof may be effected simply by use of a metallic or other shield having a suitably high heat capacity, heated from a prior run, as the source of heat for heating up the precursor to the desired temperature. Alternatively, contact or radiant heaters may be positioned in the microwave cavity below the bed of precursor and above the microwave shield (if used) so that the temperature of the precursor or at least the lower portion thereof can be elevated to the desired temperature just prior to initiating the flow of microwave radiation into the precursor. Other ways of preheating the precursor prior to the onset of the microwave radiation may also be used. The operation of (iii) hereof may be effected simply by use of the shroud in the manner described hereinabove, Alternatively, the foaming step may be conducted in an enclosed chamber through which an atmosphere enriched in vaporous lower alcohol (e.g., a $C_1$-$C_4$ alcohol) is circulated so that the developing foam structure is itself encased in this enriched vaporous atmosphere. Use of a very fine spray or mist of alcohol in a suitably-designed microwave chamber is also possible.

In accordance with, and as an outgrowth of, the use of a shroud, still another embodiment of this invention provides a method of producing a foamed polymer structure which comprises:

(i) raising the temperature of at least the lower portion of a body of polyimide precursor to a suitable temperature in the range of about 50° to about 200° C., (preferably in the range of about 60° to about 130° C.), (ii) while at least said lower portion is at said temperature, commencing the exposure of the body of polyimide precursor to microwave radiation of intensity sufficient to cause the development of a foamed polymer structure by generation and evolution of gaseous material within the body of the precursor, and (iii) concurrently preventing at least a substantial portion of the exposed surfaces ef the developing foam structure from drying out by keeping such surfaces wetted by a lower alkanol in quantity insufficient to impede the development of the foam structure.

The operation of (i) hereof may be effected in the same ways as described in the immediately preceding paragraph. As in the case of the embodiment described in the immediately preceding paragraph, the operation of (iii) hereof may be effected simply by use of the shroud in the manner described hereinabove. Alternatively, the foaming step may be conducted in an enclosed chamber in which an atmosphere saturated or almost saturated by vaporous lower alcohol (e.g., a $C_1$-$C_4$ alcohol) is maintained so that the developing foam structure is itself encased in an atmosphere that will not carry away the alcohol being liberated in the bun. Use of a very fine spray of mist of alcohol in a suitably-designed microwave chamber is also a useful alternative.

Preferred precursors for use in the embodiments of the immediately preceding two paragraphs are comprised of a lower alkyl ester of an aromatic tetracarboxylic acid and at least one aromatic or heterocyclic primary diamine. It is also preferable to employ in those embodiments a precursor that is initially in powder form.

The polyimide precursors used in the practice of this invention can vary widely in composition. In general, they are composed of a mixture comprising at least (i) one or more organic tetracarboxylic acids or derivatives thereof, and (ii) one or more organic diamines co-reactive therewith, preferably an aromatic or heterocyclic or primary diamine. Components (i) and (ii) are usually present in the mixture in essentially stoichiometric quantities.

The organic tetracarboxylic acids or derivatives thereof are preferably based on aromatic tetracarboxylic acids having the general formula:

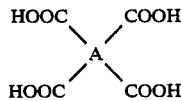

wherein A is a tetravalent organic group. The tetravalent organic group A is preferably one having one of the following structures:

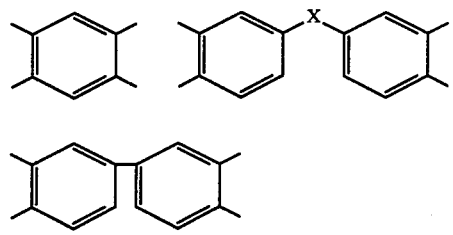

wherein X is one or more of the following:

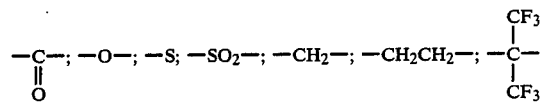

Preferred among the tetracarboxylic acid esters are the alkyl esters of 3,3′,4,4′-benzophenone tetracarboxylic acid, most preferably the lower alkyl diesters thereof. Mixtures of two or more aromatic esters, most preferably predominating in diesters, may be employed, if desired.

It is also possible, in accordance with this invention, that the tetracarboxylic acid derivative employed in the manufacture of the polyimide foams be a caprolactam as taught by U.S. Pat. Nos. 4,161,477, 4,183,838 and 4,183,839, the disclosures of which are incorporated herein by reference. As described in those patents, bisimide is formed by reaction of a tetracarboxylic acid dianhydride with an oxoimine such as caprolactam and then reacted with the diamine or diamines to produce the desired polyimides. The caprolactam is displaced during the reaction, in much the same way as is the ester portion of the tetracarboxylic acid ester.

The tetracarboxylic acid derivative used in the manufacture of the polyimide foams pursuant to this invention may also be an N-substituted imido acid ester of the tetracarboxylic acid as taught by U.S. Pat. Nos. 4,647,597 and 4,656,198, the disclosures of which are incorporated herein by reference. As described in those patents, the N-substituted imido acid ester may be formed by reacting an aromatic tetracarboxylic acid dianhydride with an amino acid and an alcohol or mixture of alcohols. As further taught in those patents, on reaction of the imido acid ester with the diamine or diamines, the acid ester group bonded to the nitrogen atom of the N-substituted imido acid ester is displaced so that the desired polyimide is formed.

The organic diamines with which the foregoing mixture of tetracarboxylic acids or derivatives is employed may be represented by the formula:

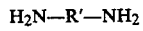

wherein R′ is an aromatic group containing 5 to 16 carbon atoms and containing up to one hetero atom in the ring, the hetero atom being nitrogen, oxygen or sulfur. Also included are aromatic groups such as:

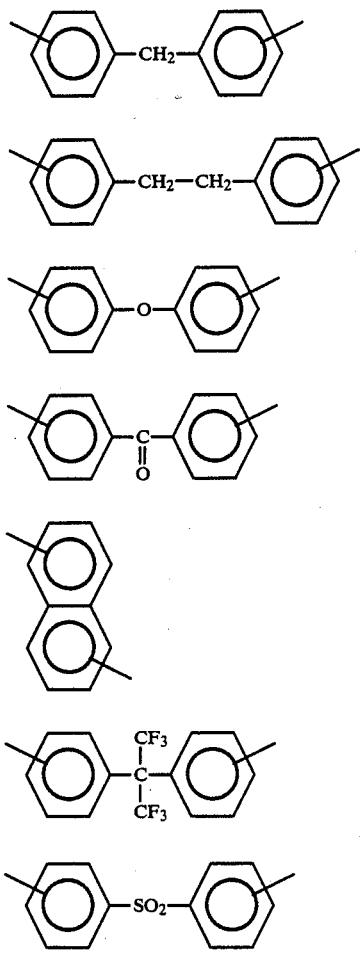

Representatives of such diamines include:
2,6-diaminopyridine;
3,5-diaminopyridine;
3,3'-diaminodiphenylsulfone;
4,4'-diaminodiphenylsulfone;
4,4'-diaminodiphenylsulfide;
3,3'-diaminodiphenylether;
4,4'-diaminodiphenylether;
meta-phenylenediamine;
para-phenylenediamine;
4,4'-methylene dianiline;
2,6-diamino toluene;
2,4-diamino toluene;
and the like.

It is also possible and sometimes desirable in the preparation of the polyimide precursors of this invention, to include in the reaction mixture one or more aliphatic diamines. Such aliphatic diamines are preferably alpha-omega diaminoalkanes having the formula:

$$H_2N-(CH_2)_n-NH_2 \quad (I)$$

wherein n is an integer from 2 to 16. Representatives of such diamines include 1,3-diaminopropane, 1,4-diaminobutane, 1,5-diaminopentane, 1,6-diaminohexane, etc.

In place of or in addition to the foregoing aliphatic amines, use can be made of aliphatic etherified polyamines of the type polyoxypropylene amines having the formula:

$$H_2N-CH(CH_3)CH_2-[OCH_2CH(CH_3)]_x-NH_2 \quad (II)$$

wherein x varies from 1 to about 5 carbon atoms.

Other useful primary diamines which may be included in the products of this invention include amino-terminated butadiene-nitrile copolymers having the general formula:

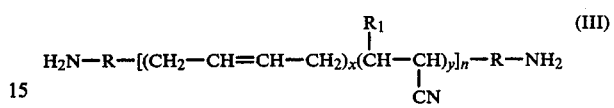

wherein R is either a phenylene group or an alkylene group, $R_1$ is hydrogen or methyl, and x and y or each independently integers ranging from 1 to 25 and n is an integer, preferably below 20. In these copolymers it is preferred that butadiene constitute at least 50% by weight of the butadiene and nitrile monomer. The nitrile monomer copolymerized with the butadiene can either be acrylonitrile or methacrylonitrile. Such compolymers generally have low molecular weights, preferably less than 3,000 to insure that they are sufficiently fluid to react in the formation of the polyimide as well as sufficiently fluid so as to be capable of foaming.

Still another type of primary diamines which may be included in the products of this invention is the aromatic amino-terminated silicones, such as those having the general formula:

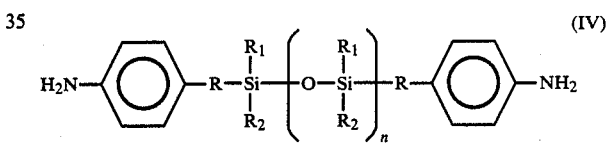

wherein R is a $C_2$ to $C_6$ alkylene group, $R_1$ and $R_2$ are each independently lower alkyl containing 1 to 3 carbon atoms and n is an integer from 1 to 4.

Another preferred category of diamines which may be utilized in forming the foams of this invention are the diesters of an amino-substituted aromatic carboxylic acid and a polymethylene glycol. Such diesters may be represented by the general formula:

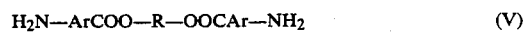

$$H_2N-ArCOO-R-OOCAr-NH_2 \quad (V)$$

wherein R is an alkylene group (which may be branched or straight chain) and which preferably contains from 3 to 8 carbon atoms, most preferably trimethylene; and Ar is an aromatic group which may be composed of one or more fused or non-fused benzene rings which in turn may carry suitable substituents (e.g., nitro, alkoxy, etc.) in addition to the primary amino groups.

A few exemplary diesters of this type include:
ethylene glycol-4-aminobenzoic acid diester;
ethylene glycol-3-aminobenzoic acid diester;
ethylene glycol-2-aminobenzoic acid diester;
trimethylene glycol-3-aminobenzoic acid diester;
trimethylene glycol-2-aminobenzoic acid diester;
trimethylene glycol-3-amino-2-nitrobenzoic acid diester;

tetramethylene glycol-3-amino-4-nitrobenzoic acid diester;
tetramethylene glycol-3-amino-5-nitrobenzoic acid diester;
tetramethylene glycol-4-amino-2-nitrobenzoic acid diester;
1,5-pentanediol-4-amino-3-nitrobenzoic acid diester;
1,6-hexanediol-5-amino-2-nitrobenzoic acid diester;
neopentyl glycol-4-amino-2-methylbenzoic acid diester;
1,8-octanediol-4-amino-2-propylbenzoic acid diester;
1,9-nonanediol-3-amino-4-methylbenzoic acid diester;
1,10-decanediol-4-(4-aminophenyl)benzoic acid diester;
and the like. Mixtures of such diesters may be employed.

A particularly preferred diester of this type is the diester of trimethylene glycol (1,3-propanediol) and 4-aminobenzoic acid.

In the practice of this invention the organic tetracarboxylic acid preferably in the form of its diester, most preferably from methanol or ethanol, is reacted with the abovereferred-to amine(s) to form a prepolymer in the form of a consolidated, fragile foam structure, which is then subjected to additional heating in order to effect imide formation and thereby cure the polymer. When using the tetracarboxylic acid ester this operation can be conducted either in the presence or absence of an added blowing agent to provide the desired polyimide foam.

The relative proportions used in the preparation of the precursors and polymers of this invention can be varied. In general, it is preferred to employ essentially stoichiometric proportions as between the mixture of tetracarboxylic acids or derivatives thereof an the primary diamine(s). However, nonstoichiometric mixtures can be used although the excess of the reactant present in excess usually does not participate in the reaction. As noted above, about 1 to about 40 mol percent (preferably about 10 to about 30 mol percent, most preferably about 20 mol percent) of the combination tetracarboxylic acids or derivatives thereof employed is composed of one or more dicarboxycyclohexenyl succinic acids or their derivatives. The balance of the combination is preferably composed of one or more aromatic or heterocyclic diamines with or without the addition of still other diamines, for example diamines of the type referred to hereinabove in Formulas I, II, III, IV and V, or any mixture thereof. Usually the overall combination of amines will contain no more than about 10 mol percent of the diamines of formulas I, II, III and IV. In the case of diamines of Formula V, these may comprise up to about 40 mol percent of the mixture of diamines used.

In accordance with one preferred foirm of the invention, use is made of a combination of aromatic amines, one of which is a nitrogen heterocyclic diamine, preferably 2,6-diaminopyridine and/or 3,5-diaminopyridine, while the other is a diamine containing two benzene rings, preferably 4,4'-methylenedianiline and/or 4,4'-oxydianiline. When using a combination of aromatic amines in accordance with this concept, the mol ratio of the non-heterocyclic diamine to the nitrogen-containing heterocyclic diamine is within the range of 1.0 to 3.0, and preferably 1.5 to 2.8.

When using a lower alkyl ester of the tetracarboxylic acid, the resulting alcohol produced in the reaction as well as the water released during the reaction can be used as the blowing agent during polymerization to form the desired polyimide foams. Alternatively, use can be made of any of a variety of organic or inorganic blowing agents. By use of a solid blowing agent such as Celogen TSH, Celogen OT, Celogen AZ 130, Celogen RA, Celogen HT 500, Celoglen HT 550, sodium bicarbonate, benzenesulfonyl hydrazide, boric acid, benzoic acid, and Expandex 5 PT of controlled particle size, the homogeneity of the cellular structure of the resulting polyimide foam can be more accurately controlled. Preferred for such use are solid blowing agents which have been subjected to ball milling or other grinding so that the blowing agent is less than 200 microns in diameter, with 98 percent of the blowing agent particle sizes being less than 150 microns in diameter.

The chemical compositions of the blowing agents identified by trade name above follow:

| Blowing Agent | Chemical Composition |
| --- | --- |
| Celogen TSH | toluenesulfonyl hydrazide |
| Celogen OT | p,p'-oxybis(benzenesulfonyl hydrazide) |
| Celogen AZ 130 | azodicarbonamide |
| Celogen RA | p-toluenesulfonyl semicarbazide |
| Celogen HT 500 | a modified hydrazine derivative |
| Celogen HT 550 | hydrazol dicarboxylate |
| Expandex 5 PT | 5-phenyltetrazole |

Variations in the concentration of the blowing agent can be used to achieve specific densities and ILD values. Concentrations of up to 10 percent based on the weight of the polyimide precursor, and preferably 1 to 5 percent, can be employed. A concentration of about 2.5 weight percent is particularly preferred.

Hydrated organic compounds of the type referred to in U.S. Pat. No. 4,621,015 may also be used as blowing agents in the process.

In the practice of this invention, it is possible to include in the reaction mixture various filler and/or reinforcing materials. For example, graphite, glass and other synthetic fibers can be added to the composition to produce a fiber-reinforced product. Microballons may be added for density adjustment, if desired. It is frequently desirable to employ a surfactant thereby increasing cellular structure stability and uniformity, the increase fatigue resistance and make the foam more flexible and resilient. The nature of such surfactants for this use is well known and reported in the patent literature.

Although not necessary, for some applications it is desirable to add a suitable quantity of a flame retardant material to the formulation in order to still further increase the flame resistance of the resultant foam.

In preparing the precursors of this invention, it is preferred to employ the procedures and spray drying techniques described in the U.S. Pat. No. 4,296,208, the disclosure of which is incorporated herein by reference.

The temperatures at which the precursor is converted to the polyimide foam are generally those temperatures used in the preparation of other polyimide polymers. As a general rule temperatures ranging from 200° to 400° C. can be used, with heating times from 5 to 60 minutes or longer. As those skilled in the art will appreciate, the time for carrying out the reaction is somewhat dependent upon the reaction temperature, higher temperatures enabling the use of shorter reaction times. It is also possible to heat to a lower temperature in the first stage of the reaction and then to higher temperatures in the later stages.

Heating can be carried out in a conventional oven if desired. Alternatively, the foaming and curing of the precursor into a foamed polyimide polymer can be effected by means of microwave heating. In this technique, the precursor is exposed for 1 to 120 minutes to radio frequencies within the range of 915 to 2450 MHz, with the power output ranging from 1 to 100 kw. The power output to prepolymer weight ratio generally falls within the range of 0.1 to 10 kw per kg.

Having described the basic concepts of the invention, reference is now made to the following example which is provided by way of illustration, but not by way of limitation of the practice of the invention.

EXAMPLE

A series of runs were conducted using 55 to 70 kg of a polyimide precursor powder in a microwave transparent mold using a microwave power input of 30 kw. The well-mixed powder was composed of 4,4'-methylenedianiline (MDA), 2,6-diaminopyridine (DAP) and benzophenone tetracrboxylic acid dimethyl ester (DTDE) in the mol ratio of approximately 0.7 MDA: 0.3 DAP: 1.0 BTDE. The powder was covered with a layer of polyvinyl chloride film, and an aluminum microwave shield ⅛ or ¼ inch thick was positioned directly below the powder bed. The shield was covered by a temperature resistant cloth, and rested upon a layer of polyimide foam thermal insulation. The artifacts were formed in microwave-transparent molds, and were removed therefrom and cured in a thermal oven at 500°–550° F. for 30 minutes. In each case the yield of specification grade foam was significantly higher than a control run in which no shroud or shield was used.

The foregoing disclosure has been presented for purposes of illustration and not limitation. As can readily be appreciated by those skilled in the art, this invention is susceptible to considerable variation in its practice within the spirit and scope of the ensuing claims.

We claim:

1. A bun of cured polyimide foam produced by (i) exposing to microwave radiation of intensity sufficient to cause the development of a foamed polymer structure, a body of polyimide precursor and the foam structure developing therefrom while (a) maintaining said body and said foam structure as it is developing therefrom under a substantially vapor-impermeable microwave-compatible shroud that does not substantially restrict or impede development of the foam structure, and (b) directing the microwave radiation upon the top, sides and ends of said body of polyimide precursor and of the foam structure as it is development therefrom, but curtailing the extent to which such radiation impinges upwardly into the bottom of said body and said foam structure; and (ii) curing the deveolped foam structure to a bun of cured polyimide foam; said bun being characterized by having a greater amount and uniformity of cell structure than a bun made from another portion of the said foamable polyimide precursor under the same conditions but without use of (a) and (b).

2. A bun of cured polyimide foam produced by (i) exposing to microwave radiation of intensity sufficient to cause the development of a foamed polymer structure, a body of polyimide precursor and the foam structure developing therefrom while (a) maintaining said body and said foam structure as it is developing therefrom under a substantially vapor-impermeable microwave-compatible shroud that does not substantially restrict or impede development of the foam structure, and (b) directing the microwave radiation upon the top, sides and ends of said body of polyimide precursor and of the foam structure as it is developing therefrom, but curtailing the extent to which such radiation impinges upwardly into the bottom of said body and said foam structure by maintaining a metal shield in proximity to the bottom of said bed and foam structure developing therefrom; and (ii) curing the developed foam structure to a bun of cured polyimide foam; said bun being characterized by having a greater amount and uniformity of cell structure than a bun made from another portion of the said foamable polyimide precursor under the same conditions but without use of (a) and (b).

3. An article of claim 2 wherein the polyimide precursor was initially in powder form.

4. An article of claim 2 wherein the shroud used was a polymer film.

5. An article of claim 2 wherein the final curing of the developed foam structure was conducted in a thermal oven.

6. An article of claim 2 wherein the polyimide precursor comprised di-lower alkyl ester of an aromatic tetracarboxylic acid and diamine composed predominantly of 4,4'-methylenedianiline or 4,4'-oxydianiline, or both.

7. An article of claim 6 wherein the ester was predominantly the di-lower alkyl ester of 3,3'-4,4'-benzophenone tetracarboxylic acid and the diamine was predominantly 4,4°-methylenedianiline.

8. An article of claim 6 wherein the ester was predominantly the di-lower alkyl ester of 3,3'-4,4'-benzophenone tetracarboxylic acid and the diamine was a combination of 4,4'-methylenedianiline and 2,6-diaminopyridine, the mol ratio of such ester and amines being approximately 1.0:0.7:0.3, respectively.

9. An article of claim 6 wherein the polyimide precursor included a surfactant.

10. A bun of cured polyimide foam produced by (i) raising the temperature of at least the lower portion of a body of polyimide precursor to a suitable temperature in the range of about 50° to about 200° C., (ii) while at least said lower portion is at said temperature, commencing the exposure of the body of polyimide precursor to microwave radiation of intensity sufficient to cause the development of a foamed polymer structure by generation and evolution of gaseous material within the body of the precursor, (iii) maintaining said body and said foam structure as it is developing therefrom under a substantially vapor-impermeable microwave-compatible shroud that does not substantially restrict or impede development of the foam structure, and (iv) curing the developed foam structure to a bun of cured polyimide foam.

11. An article of claim 10 wherein said temperature was in the range of about 60° to about 130° C., wherein the polyimide precursor comprised di-lower alkyl ester of benzophenone tetracarboxylic acid and diamine composed predominantly of 4,4'-methylenedianiline or 4,4'-oxydianiline, or both.

12. An article of claim 10 wherein the final curing of the developed foam structure was conducted in a thermal oven.

13. A bun of cured polyimide foam produced by (i) raising the temperature of at least the lower portion of a body of polyimide precursor to a suitable temperature in the range of about 50° to about 200° C., (ii) while at least said lower portion is at said temperature, commencing the exposure of the body of polyimide precursor to microwave radiation of intensity sufficient to cause the development of a foamed polymer structure by generation and evolution of gaseous material within the body of the precursor, (iii) concurrently preventing at least a substantial portion of the exposed surfaces of the developing foam structure from drying out by keeping such surfaces wetted by a lower alkanol in quantity insufficient to impede the development of the foam structure, and (iv) curing the developed foam structure to a bun of cured polyimide foam.

14. An article of claim 13 wherein said temperature was in the range of about 60° to about 130° C., wherein the polyimide precursor comprised di-lower alkyl ester of benzophenone tetracarboxylic acid and diamine composed predominantly of 4,4'-methylenedianiline or 4,4'-oxydianiline, or both.

15. An article of claim 13 wherein the final curing of the developed foam structure was conducted in a thermal oven.

* * * * *